US010696827B2

(12) United States Patent
Vachon et al.

(10) Patent No.: US 10,696,827 B2
(45) Date of Patent: Jun. 30, 2020

(54) POLYOLEFIN COMPOSITION COMPRISING AN ANTIMICROBIAL ADDITIVE

(71) Applicant: SABIC GLOBAL TECHNOLOGIES B.V., Bergen op Zoom (NL)

(72) Inventors: Jerome Vachon, Geleen (NL); Mark Johannes Boerakker, Eindhoven (NL); AT Kavya, Bangalore (IN); Ajay Kumar Taraiya, Geleen (NL); Satishkumar Mahanth, Bangalore (IN); Roshan Kumar Jha, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 32 days.

(21) Appl. No.: 15/754,443

(22) PCT Filed: Jul. 21, 2016

(86) PCT No.: PCT/EP2016/067374
§ 371 (c)(1),
(2) Date: Feb. 22, 2018

(87) PCT Pub. No.: WO2017/032516
PCT Pub. Date: Mar. 2, 2017

(65) Prior Publication Data
US 2018/0244902 A1    Aug. 30, 2018

(30) Foreign Application Priority Data

Aug. 26, 2015   (EP) ..................................... 15182539

(51) Int. Cl.
| | |
|---|---|
| *A01N 65/00* | (2009.01) |
| *C08K 5/13* | (2006.01) |
| *C08L 23/06* | (2006.01) |
| *C08L 23/12* | (2006.01) |
| *A01N 31/08* | (2006.01) |
| *A01N 31/16* | (2006.01) |
| *C08K 9/12* | (2006.01) |
| *C08K 3/22* | (2006.01) |
| *A01N 25/10* | (2006.01) |
| *C08K 5/00* | (2006.01) |
| *F16L 11/04* | (2006.01) |

(52) U.S. Cl.
CPC .............. *C08L 23/06* (2013.01); *A01N 25/10* (2013.01); *A01N 31/08* (2013.01); *A01N 31/16* (2013.01); *C08K 3/22* (2013.01); *C08K 9/12* (2013.01); *C08K 5/0058* (2013.01); *C08K 5/13* (2013.01); *C08K 2003/2296* (2013.01); *C08L 2203/18* (2013.01); *C08L 2207/062* (2013.01); *F16L 11/04* (2013.01)

(58) Field of Classification Search
CPC ............... C08L 23/06; C08L 2203/18; C08L 2207/062; A01N 25/10; A01N 31/08; A01N 31/16; C08K 3/22; C08K 9/12; C08K 5/0058; C08K 5/13; C08K 2003/2296; F16L 11/04
See application file for complete search history.

(56) References Cited

U.S. PATENT DOCUMENTS

| | | | | |
|---|---|---|---|---|
| 4,559,376 | A  * | 12/1985 | Kubat ....................... | C08L 1/02 524/13 |
| 5,912,030 | A | 6/1999 | Huzinec et al. | |
| 2006/0275571 | A1 * | 12/2006 | Mure ....................... | C08L 23/04 428/36.9 |

FOREIGN PATENT DOCUMENTS

| | | |
|---|---|---|
| AU | 2005256153 B2 | 1/2006 |
| CN | 104235521 A  * | 12/2014 |
| EP | 2725057 A1 | 4/2014 |
| GB | 1034112 A | 6/1966 |
| JP | H0797486 A | 4/1995 |
| JP | H07228711 A | 8/1995 |
| WO | 2004004456 A1 | 1/2004 |
| WO | 2006000032 A1 | 1/2006 |
| WO | WO-2013036581 A1 * | 3/2013 |
| WO | 2015051020 A1 | 4/2015 |

OTHER PUBLICATIONS

Andrew J. Peacock, "Handbook of Polyethylene: Structures, Properties and Applications," Marcel Dekker, Inc., New York, 2000, pp. 43-66.
International Search Report for International Application No. PCT/EP2016/067374; International Filing Date: Jul. 21, 2016; dated Sep. 28, 2016; 6 pages.
Machine Translation of JPH07228711; Date of Publication: Aug. 29, 1995; 7 Pages.
Machine Translation of JPH0797486A; Date of Publication: Apr. 11, 1995; 5 Pages.
Written Opinion of the International Searching Authority for International Application No. PCT/EP2016/067374; International Filing Date: Jul. 21, 2016; dated Sep. 28, 2016; 7 Pages.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

The invention is directed to a composition comprising 90.00 to 99.95 wt % of a polyolefin and 0.05 to 10.00 weight % of an antimicrobial additive based on the total weight of the polyolefin composition wherein the antimicrobial additive comprises a phenolic group and wherein a carrier for the antimicrobial additive is present. The antimicrobial additive may be dispersed through the polyolefin composition. Preferred antimicrobial additives include for example eugenol, isoeugenol, thymol, carvacrol, sesamol, curcumin, p-hydroxybenzoic acid, gallic acid and its ester derivatives (propyl gallate, octyl gallate and dodecyl gallate), ferulic acid, syringic acid, coumaric acid, protocatechuic acid, caffeic acid and/or tannic acid.

22 Claims, No Drawings

POLYOLEFIN COMPOSITION COMPRISING AN ANTIMICROBIAL ADDITIVE

CROSS REFERENCE TO RELATED APPLICATIONS

This application is a 371 of International Application No. PCT/EP2016/067374, filed Jul. 21, 2016, which claims priority to European Application No. 15182539.5 filed Aug. 26, 2015 which are incorporated herein by reference in their entirety.

The invention is directed to a polyolefin composition comprising an antimicrobial additive, a process for the preparation of a polyolefin composition and the use of a polyolefin composition.

There exist many materials originating from a natural source that are known for their antimicrobial properties. Most of these materials have already been used as an alternative to synthetic preservatives in food or in medical or cosmetic applications. One of the most widely used natural antimicrobial additive is an additive derived from essential oils.

Polymeric articles comprising essential oils derived compounds have been described for various purposes. The use of polymeric compositions comprising essential oils derived compounds is for example disclosed in JP H07 97486, WO 2006/000032, JP H07 228711, GB 1 034 112 and EP 2 725 057.

JP H07 97486 describes a polyolefin polymer in combination with a low concentration in the range between 250 to 2000 ppm of an antioxidant material for instance eugenol or sesamol. JP H07 97486 does not disclose any acceptable and reproducible antimicrobial properties at such low concentration.

WO 2006/000032 describes antimicrobial polymer blends obtained by blending ethylene vinylacetate and low density polyethylene comprising more than 0.05% by weight of a volatile essential oil such as methyl eugenol, thymol and carvacrol. To improve the retention of the antimicrobial additive, a binding agent such as polyethylene glycol is used. A disadvantage of the antimicrobial polymer blend according to WO 2006/000032 is the need of a binding agent when using a blend of EVA and LDPE.

JP H07 228711 describes antioxidant food packaging material made from a polyolefin resin layer containing an antioxidant additive based on an extract of spice which may contain eugenol, thymol or carvacrol. JP H07 228711 does not disclose any acceptable and reproducible antimicrobial properties.

GB 1 034 112 describes the use of a thermoplastic material to come into contact with natural or artificial body cavities which display antimicrobial activity. As an example 4-n-hexyl resorcinol is applied as an antimicrobial additive and mixed with LDPE resin using an extruder at melting temperature of the polymer (150° C.). The materials were further transformed into catheters, inoculated with a strain of Staphylococcus aureus and inserted in dorsal subcutaneous tissue of rabbits. While using 0.1 wt % of additive, no result were mentioned. Only using >0.4% of additive showed little to no infection. This may indicate the lack of proper activity when using low loadings such as 0.1 wt %.

EP 2 725 057 describes the use of an acid scavenger within a polyolefin material against disinfectant containing water. The additional use of an antioxidant for example a substituted phenol is disclosed. It is not obvious that the formulation which is described using a complex combination of an acid scavenger and various antioxidant will display any antimicrobial properties as, for instance, the activity of antimicrobial additives such as substituted phenols are pH sensitive.

There is an ongoing need to develop polyolefin compositions comprising an antimicrobial additive with improved antimicrobial properties.

This object is achieved by a polyolefin composition comprising 90.00 to 99.95 wt % of a polyolefin and 0.05 to 10.00 weight % of an antimicrobial additive based on the total weight of the polyolefin composition wherein the antimicrobial additive comprises a phenolic group and wherein a carrier for the antimicrobial additive is present.

According to a preferred embodiment of the invention cellulose is applied as a carrier of the antimicrobial additive.

According to a preferred embodiment of the invention the carrier is microcrystalline cellulose (MCC).

The advantage of these cellulose compounds is to disperse uniformly the antimicrobial additive. Furthermore, the carrier reduces the leaching from the final material.

Preferably, the concentration of the carrier, preferably the cellulose, ranges between 0.1 and 5% wt of the polyolefin composition.

Examples of natural antimicrobial additives that are derived from plants are plant extracts and oils, or natural antimicrobial additives that are isolated from these extracts and oils. Natural antimicrobial additives can also be derived from parts of plants, such as, for example, leaves, fruits, buds, bulbs and seeds.

Examples of plants with antimicrobial properties are basil, caraway, cardamom, cinnamon, clove, coleus, coriander, cumin, fennel, fenugreek, garlic, grape, green tea, horseradish, kaempferia galanga, lemon, marjoram, mint, mustard, neem, nutmeg, olea, onion, oregano, peppers, rosemary, sage, tea tree, thyme, turmeric and wasabi.

According to a preferred embodiment of the invention the natural antimicrobial additive comprises a substituted phenol group.

According to a further preferred embodiment of the invention the antimicrobial additive is a compound according to Formula 1

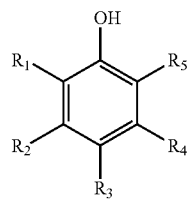

Formula 1 wherein $R_1$-$R_5$ may be (i) H, and/or (ii) alkyl ($C_1$-$C_{10}$) group and/or (iii) OH or alkoxy ($C_1$-$C_{10}$) group and/or (iv) phenyl group and/or (v) carboxylic acid and/or (vi) ketone or ester group with alkyl ($C_1$-$C_{10}$) group.

The alkyl ($C_1$-$C_{10}$) groups and the alkoxy ($C_1$-$C_{10}$) group may be linear or branched or cyclic chains.

The linear/branched/cyclic group may be a group with or without unsaturation.

The alkoxy group may be a group with or without unsaturation.

The phenyl group may be a group with or without OH and/or alkoxy-substituents ($C_1$-$C_{10}$).

The ketone or ester group may be a group that contains a chain with or without unsaturation.

Suitable examples of antimicrobial additives according to Formula 1 include eugenol, isoeugenol, thymol, carvacrol, sesamol, curcumin, p-hydroxybenzoic acid, gallic acid and its ester derivatives (for example propyl gallate, octyl gallate and dodecyl gallate), ferulic acid, syringic acid, coumaric acid, protocatechuic acid, caffeic acid, tannic acid and/or the ester derivatives of the acid.

Also combinations of natural antimicrobial additives can be used.

Preferred antimicrobial additives according to Formula 1 are selected from eugenol, thymol carvacrol, propyl gallate, octyl gallate and/or dodecyl gallate.

The antimicrobial activity is obtained throughout the complete polyolefin composition when the antimicrobial additive is mixed with a non-functionalized polyolefin. This fact has the advantage that when the surface of the article is damaged the antimicrobial properties of the article are still present on the surface of the article.

A further advantage is that the presence of the antimicrobial additive does not substantially affect the mechanical properties of the polyolefin composition.

According to a preferred embodiment of the invention, the antimicrobial additive is dispersed through the polyolefin composition. As used herein, the term "the antimicrobial additive is dispersed through the polyolefin composition" is understood to mean that the antimicrobial additive is present in the bulk of the composition as well as at the surface of the composition, i.e. the composition is a mixture of the antimicrobial additive and the polyolefin instead of the natural antimicrobial additive being present only at the surface.

Another advantage is that articles prepared from the composition have surface and bulk antimicrobial properties. This has the consequence that when during the construction of the article the polyolefin needs to be cut, the surface of the area that is exposed after cutting will also have antimicrobial properties.

A further advantage is that the polyolefin in the polyolefin composition does not need to be activated to obtain a polyolefin composition with antimicrobial properties. Process steps for activation and the activating substances are superfluous, which has financial advantages.

Another advantage of the invention is the resulting environmental friendly polyolefin article because of the use of natural antimicrobial additives.

The term "antimicrobial" as used herein means bactericidal as is commonly known in the art. The number of bacteria present after contact with an antimicrobial material is substantially reduced from the number initially present. The number of bacteria present is normally measured as colony-forming units (CFU).

The term "natural" as used herein means derived from a natural source for example plants.

According to a preferred embodiment of the invention the amount of polyolefin in the composition ranges between 92.00 and 99.95 wt % and more preferably between 94.00 and 99.95 wt %.

Preferably the composition comprises between 0.02 and 8.00 weight % of the antimicrobial additive. More preferably the composition comprises between 0.05 and 6.00 weight % of the antimicrobial additive.

Preferably the polyolefin is polyethylene or polypropylene.

Most preferably the polyolefin is polyethylene.

Polyethylene may be selected from high density polyethylene (HDPE), multimodal high density polyethylene such as bimodal high density polyethylene (bimodal HDPE) and trimodal high density polyethylene, low density polyethylene (LDPE), linear low density polyethylene (LLDPE), metallocene-catalyzed polyethylene, very low density polyethylene (VLDPE), ultrahigh molecular weight polyethylene (UHMWPE), high performance polyethylene (HPPE) or copolymers of ethylene and propylene or other monomers. Preferably, polyethylene is selected from high-density polyethylene, low density polyethylene, linear low density polyethylene and multimodal bimodal high density polyethylene.

The production processes of polyethylenes are summarised in "Handbook of Polyethylene" by Andrew Peacock (2000; Dekker; ISBN 0824795466) at pages 43-66.

The polyolefin composition may further contain one or more of usual additives, like stabilizers, processing aids, impact-modifiers, flame-retardants, acid scavengers, inorganic fillers and colorants.

Preferably the polyolefin is not functionalized.

According to a preferred embodiment of the invention the polyolefin composition also comprises ZnO.

The amount of ZnO may range between 1 and 5 wt % based on the total weight of the polyolefin composition.

Further, the polyolefin composition may comprise a silicone additive. Small amounts of silicone additives can potentially facilitate the surface migration of the natural antimicrobial additives. In this case, the natural antimicrobial additive is present both at the surface and the bulk but the concentration of the antimicrobial additive is higher at the surface. The presence of a higher concentration of the antimicrobial additive at the surface is advantageous in that the surface of the article is most prone to the anchoring of the microbes. Examples of silicone additives are, for example, silicone fluids, as for example SF1706.

The invention is also directed to a process for the preparation of the polyolefin composition according to the present invention, comprising providing a dispersion of the antimicrobial additive in a molten polyolefin.

Preferably, dispersion is performed by heating the polyolefin to a temperature above the melting point of the polymer and mixing the natural antimicrobial additive in the polymer. Mixing can be performed in any way known to the person skilled in the art. Commonly used mixing devices are a tumbler mixer, a high-speed mixer; blenders, for example V blender, ribbon blender or a cone blender; mixers, for example a jet mixer, a planetary mixer or a Banbury mixer. During mixing the mixture can be preheated. Mixing can also be performed in a part of an extruder.

Examples of extruders are mono and twin screw extruders. In the extruder the polyolefin is heated to a temperature above the melting point of the polymer and the natural antimicrobial additive is dispersed through the molten polyolefin. The temperature during extrusion can be varied within wide limits depending on the melting point of the polyolefin. According to a preferred embodiment of the extrusion is performed at a temperature below 250° C., more preferably between 150 and 200° C. The temperature during extrusion preferably is chosen as low as possible in view of possible degradation of the natural antimicrobial additive.

After heating the polyolefin composition can be formed into a shape. This shape can be a pellet, but also semi-finished product or an article.

Suitable examples of processes in which the polyolefin composition is formed into a shape include blow molding, injection molding, compression molding, thermoforming, film blowing, casting and extrusion compression molding. Film blowing is widely used to produce films. Injection molding and blow molding are widely used to produce articles such as, bottles, boxes and containers. Extrusion is widely used to produce articles for example rods, sheets and pipes.

After extrusion and molding, the polyolefin composition is cooled and dried. Preferably, drying is performed at a temperature below 100° C., more preferably below 80° C., most preferably below 60° C. The temperature during drying is, like the temperature during extrusion, preferably chosen as low as possible in view of possible degradation of the natural antimicrobial additive.

Preferably, drying is performed in air, but drying can also be performed in an inert environment, for example under a nitrogen blanket. The drying time can be chosen in wide limits; preferably the drying time is less than 24 hours, more preferably less than 12 hours, most preferably less than 10 hours.

The invention is also directed to the use of the polyolefin composition for the preparation of an article. The article is preferably an article for the storage or transport of food or beverages.

According to a preferred embodiment of the invention the article is a pipe. More preferably the article is a pipe for the transport of a fluid. The fluid can be a beverage, for example water and for example a soft drink, wine, beer or milk. Preferably, the fluid is drinking water.

According to a preferred embodiment of the invention the pipe is made of multimodal high density polyethylene and the fluid is drinking water.

According to a further preferred embodiment of the invention the article is a flexible packaging. Suitable examples are films, sheets, plastic bags, containers, bottles, boxes and buckets. According to a further preferred embodiment of the invention the polymer composition is applied in the pharmaceutical packaging market for example in primary packaging that is in direct contact with the active pharmacy ingredient and includes blister packs, fluid bags, pouches, bottles, vials and ampoules and for example in secondary packaging which includes every part of the total concept or medical device that is not in direct contact with the packed drug or fluid.

According to a further preferred embodiment of the invention the polymer composition is applied in medical applications. Medical applications include for example closures, rigid bottles and ampoules, needle sheaths, plunger rods for single-use syringes, mouldings to house diagnostic equipment, collapsible tube shoulders, blow-fill-seal products, collapsible tube bodies, film for primary and secondary medical and pharmaceutical packaging, disposable syringes, actuator bodies, specimen cups, mouldings to house diagnostic equipment, centrifuge tubes, multi-well micro-titration plates, trays, pipettes and caps and closures.

The invention will now be elucidated by way of the following examples without being limited thereto.

EXAMPLES

The following materials were used to prepare the samples:
HDPE; Sabic® Vestolen A6060R,
Eugenol: Katyani exports
Thymol: Katyani exports
Carvacrol: Katyani exports
MCC: Dhariyal Polymers Pvt. Ltd 1. Preparation of the Samples The various components of a formulation were thoroughly mixed in a Ziploc bag prior to adding it to the hopper of the extruder. Thus, all the components of a formulation were added at the same point during extrusion. Extrusion was carried out in a 6-barrel extruder with the temperature varying from 170-210° C. The various formulations that were prepared are summarized in Table 1. The screw speed was 300 rpm. The strands coming out of the die were cooled in a water bath and then pelletized. The pellets were dried at 90° C. for 8 hours prior to compression molding them into 150 mm×150 mm×1.8 mm sheets. 50 mm square plaques were cut out from these sheets for antimicrobial testing as well as ASTM tensile bars using a punch.

The amount of the components in a sample is given in Table 1.

2. Testing and Characterization 2.1 Leaching Test 1 g of the material to be studied was cut into small pieces from the molded sheet. This material was placed in 5 ml of deionized water in a round bottom flask and let still at room temperature (~25° C.). An aliquot of the water was withdrawn after 7 days. High performance liquid chromatography (HPLC) was used for determining the presence of the leachate (such as eugenol, thymol, carvacrol etc. depending on the formulation). The results are given in ppm of the leachate (see Table 1).

2.2 Antimicrobial Testing

Japanese Industrial Standard (JIS Z 2801: 2000) protocol was used for antimicrobial testing. Briefly, a 500 mm² area of the formulation to be tested is inoculated with gram positive and gram negative bacterial strains. The growth is compared relative to the reference sample (without any antimicrobial treatment). A logarithmic factor of reduction (R) is assigned to each material depending upon the extent of growth relative to the reference material. Antimicrobial tests were performed at external laboratory.

The test protocol is as follows:

Test method: JIS Z 2801

Organism used: *Escherichia coli* (gram-negative) & *Staphylococcus aureus* (gram positive)

Sample size: 5*5 cm

Measuring method: Plate count method

Sterilization method: Surface sterilization with Alcohol

Incubation time: 48 Hrs.

3. Examples I-III and Comparative Examples A-F

The results are given in logarithmic reduction R, wherein R is the value of antimicrobial activity.

U0 is the average of the common logarithm of the number of viable bacteria in cells/cm², recovered from the untreated test specimens immediately after inoculation (TO).

Ut is the average of the common logarithm of the number of viable bacteria in cells/cm², recovered from the untreated test specimens after 24 hours (T24h).

At is the average of the common logarithm of the number of viable bacteria in cells/cm², recovered from the treated test specimens after 24 hours (test 24 h).

R is calculated according to the following formula:
$$R=(Ut-U0)-(At-U0)=Ut-At$$

The value of R for the examples is given in Table 1.

TABLE 1

| Example | Loading (wt %) HDPE | MCC | E. Coli: R (/5) | S. Aureus: R (/5) | Leaching (ppm) |
|---|---|---|---|---|---|
| Eugenol | | | | | |
| A | 99.75 | 0.25 | 0 | 4.74-4.85 | 4.78-4.83 | 81 |
| B | 99.9 | 0.1 | 0 | 0.37-4.74 | 0.82-4.83 | 25 |
| I | 98.9 | 0.1 | 1 | 4.74 | 4.36 | 11 |
| I after 30 days in water | 98.9 | 0.1 | 1 | 4.73 | 4.56 | |
| Thymol | | | | | |
| C | 99.75 | 0.25 | 0 | 4.85 | 4.3 | 23 |
| D | 99.9 | 0.1 | 0 | 0.85-4.74 | 1.87-4.36 | 15 |
| II | 98.9 | 0.1 | 1 | 4.74 | 4.53 | 5 |
| II after 30 days in water | 98.9 | 0.1 | 1 | 2.95 | 3.79 | |
| Carvacrol | | | | | |
| E | 99.75 | 0.25 | 0 | 4.85 | 3.88 | 65 |
| F | 99.9 | 0.1 | 0 | 4.74-4.85 | 1.63-4.78 | 18 |
| III | 98.9 | 0.1 | 1 | 4.74 | 4.83 | 6 |
| III after 30 days in water | 98.9 | 0.1 | 1 | 4.73 | 4.56 | |

The examples show that the combination of an additive in combination with a carrier according to the invention results in a very good antimicrobial activity with the lowest leaching.

The invention claimed is:

1. Polyolefin composition comprising 90.00 to 99.95 wt % of a polyolefin and 0.05 to 10.00 weight % of an antimicrobial additive based on the total weight of the polyolefin composition wherein a carrier for the antimicrobial additive is present,
   wherein the carrier is cellulose; and
   the antimicrobial additive comprises a substituted phenolic group.

2. The polyolefin composition according to claim 1 wherein the cellulose is microcrystalline cellulose.

3. The polyolefin composition according to claim 1 wherein the antimicrobial additive is a compound according to Formula 1

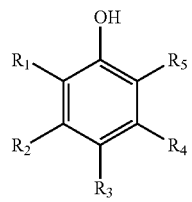

Formula 1 wherein $R_1$-$R_5$ is (i) H, and/or (ii) alkyl ($C_1$-$C_{10}$) group and/or (iii) OH or alkoxy ($C_1$-$C_{10}$) group and/or (iv) phenyl group and/or (v) carboxylic acid and/or (vi) ketone or ester group with alkyl ($C_1$-$C_{10}$) group.

4. The polyolefin composition according to claim 3 wherein the compound according to Formula 1 is selected from eugenol, isoeugenol, thymol, carvacrol, sesamol, curcumin, an acid which is p-hydroxybenzoic acid, gallic acid, ferulic acid, syringic acid, coumaric acid, protocatechuic acid, caffeic acid, or tannic acid, and/or the ester derivatives of the acid.

5. The polyolefin composition according to claim 4 wherein the compound according to Formula 1 is selected from eugenol, thymol, carvacrol, propyl gallate, octyl gallate, and/or dodecyl gallate.

6. The polyolefin composition according to claim 1 wherein the antimicrobial additive is dispersed through the polyolefin composition.

7. The polyolefin composition according to claim 1 wherein the polyolefin is polyethylene or polypropylene.

8. The polyolefin composition according to claim 1, wherein the polyolefin composition comprises ZnO.

9. The polyolefin composition of claim 8, wherein an amount of ZnO ranges between 1 and 5 wt % based on the total weight of the polyolefin composition.

10. The polyolefin composition according to claim 1 wherein the polyolefin composition comprises a silicone additive.

11. Process for the preparation of a polyolefin composition according to claim 1 comprising providing a dispersion of the antimicrobial additive in a molten polyolefin.

12. An article manufactured from and comprising the polyolefin composition according to claim 1.

13. A pipe manufactured from and comprising the polyolefin composition according to claim 1.

14. The pipe of claim 13, wherein the antimicrobial additive is dispersed uniformly throughout the pipe.

15. Flexible packaging manufactured from and comprising the polyolefin composition according to claim 1.

16. The flexible packaging of claim 15, wherein the antimicrobial additive is dispersed uniformly throughout the flexible packaging.

17. The polyolefin composition of claim 1, wherein the carrier ranges between 0.1 and 5 wt % of the polyolefin composition.

18. The polyolefin composition of claim 1, wherein the antimicrobial additive is dispersed uniformly throughout the polyolefin composition.

19. The polyolefin composition of claim 1 comprising:
   94 to 99.95 wt % of the polyolefin;
   0.05 to 6 wt % of the antimicrobial additive; and
   0.1 to 5 wt % of the carrier,
   wherein the polyolefin comprises a polyethylene;
   the antimicrobial additive comprises eugenol, thymol, carvacrol, or a combination thereof; and
   the carrier is microcrystalline cellulose.

20. The polyolefin composition of claim 19, wherein the polyolefin is a high density polyethylene.

21. A pipe comprising the polyolefin composition of claim 19.

22. The pipe of claim 21, wherein the antimicrobial additive is dispersed uniformly throughout the pipe.

* * * * *